(12) United States Patent
Lee et al.

(10) Patent No.: US 10,547,430 B2
(45) Date of Patent: Jan. 28, 2020

(54) METHOD FOR REPORTING CHANNEL STATE IN WIRELESS COMMUNICATION SYSTEM AND DEVICE THEREFOR

(71) Applicant: LG ELECTRONICS INC., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/251,837

(22) Filed: Jan. 18, 2019

(65) Prior Publication Data

US 2019/0229874 A1 Jul. 25, 2019

Related U.S. Application Data

(63) Continuation of application No. PCT/KR2017/008433, filed on Aug. 4, 2017.

(60) Provisional application No. 62/373,982, filed on Aug. 11, 2016, provisional application No. 62/398,528, filed on Sep. 23, 2016, provisional application No. 62/520,547, filed on Jun. 15, 2017.

(51) Int. Cl.
*G06F 11/00* (2006.01)
*H04L 5/00* (2006.01)
*H04L 5/14* (2006.01)

(52) U.S. Cl.
CPC .............. *H04L 5/0053* (2013.01); *H04L 5/14* (2013.01)

(58) Field of Classification Search
CPC .................. H04L 5/0053; H04L 5/14

USPC .................. 370/252, 254, 329, 330
See application file for complete search history.

(56) References Cited

U.S. PATENT DOCUMENTS

| | | | | |
|---|---|---|---|---|
| 2014/0078919 | A1* | 3/2014 | Hammarwall | ........ H04L 5/0057 370/252 |
| 2015/0207604 | A1* | 7/2015 | Sun | ....................... H04B 7/0626 370/329 |

(Continued)

FOREIGN PATENT DOCUMENTS

| | | |
|---|---|---|
| EP | 2677671 A1 | 12/2013 |
| WO | 2015160198 A1 | 10/2015 |

OTHER PUBLICATIONS

LG Electronics, "Discussion on CSI reporting enhancements for hybrid CSI-RS", 3GPP TSG RAN WG1 Meeting #85, May 23-27, 2016, R1-164526.

(Continued)

*Primary Examiner* — Chuong T Ho
(74) *Attorney, Agent, or Firm* — Dentons US LLP

(57) ABSTRACT

According to one embodiment of the present invention, a method by which a terminal reports a channel state on the basis of a channel state information-reference signal (CSI-RS) in a wireless communication system can comprise the steps of: transmitting, to a base station, terminal capability information related to the maximum number of CSI processes which can be simultaneously updated or calculated by the terminal in which a shortened processing time has been set; receiving an aperiodic CSI request from the base station; and, according to the aperiodic CSI request, updating or calculating CSI in a CSI reference resource at the point of time set for the shortened processing time, on the basis of the terminal capability information and transmitting the updated or calculated CSI to the base station.

16 Claims, 6 Drawing Sheets

(56) References Cited

U.S. PATENT DOCUMENTS

2015/0295694 A1* 10/2015 Li ................. H04L 1/0026
370/329
2018/0048447 A1* 2/2018 Nogami .............. H04L 1/00

OTHER PUBLICATIONS

Xinwei, "Discussion on CSI reporting for hybrid CSI-RS", 3GPP TSG RAN WG1 Meeting #85, May 23-27, 2016, R1-164895.
Ericsson, "Hybrid CSI Reporting with One and Two CSI Processes", 3GPP TSG-RAN WG1 #85, May 23-27, 2016, R1-165098.

* cited by examiner

METHOD FOR REPORTING CHANNEL STATE IN WIRELESS COMMUNICATION SYSTEM AND DEVICE THEREFOR

This application is a continuation of PCT International Application No. PCT/KR2017/008433, filed on 4 Aug. 2017, which claims priority under 35 U.S.C. 119(e) to U.S. Provisional Application Nos. 62/373,982 filed on 11 Aug. 2016, 62/398,528 filed on 23 Sep. 2016, and 62/520,547 filed on 15 Jun. 2017, which is hereby incorporated by reference herein in their entirety.

TECHNICAL FIELD

The present invention relates to a wireless communication system, and more particularly, to a method and apparatus for reporting a channel status.

BACKGROUND ART

The latency of packet data is one of important performance metrics. It may be said that providing faster Internet access with a shortened latency to end users is one of challenging issues in designing a next generation mobile communication system called new radio access technology (new RAT) as well as long term evolution (LTE).

The present invention is intended to deal with channel status reporting in a wireless communication system supporting latency reduction.

DISCLOSURE

Technical Problem

The present invention proposes a channel state reporting method.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present invention, a method of reporting a channel state based on a channel state information-reference signal (CSI-RS), performed by a UE in a wireless communication system includes transmitting, to a base station, UE capability information about a maximum number of channel state information (CSI) processes can be simultaneously updated or calculated by the UE configured with a shortened processing time, receiving an aperiodic CSI request from the base station, and updating or calculating CSI in a CSI reference resource at a timing configured for the shortened processing time based on the UE capability information according to the aperiodic CSI request, and transmitting the updated or calculated CSI to the base station.

Additionally or alternatively, the UE capability information may include information about a maximum number of CSI processes which the UE can be simultaneously updated or calculated, per numerology configured for the UE and/or per processing time configured for the UE.

Additionally or alternatively, if the updated or calculated CSI is transmitted in a subframe n, the CSI reference resource in which the updated or calculated CSI is measured may belong to a subframe n−k where a minimum value of k may be set to an integer less than a minimum value set for a UE which is not configured with a shortened processing time.

Additionally or alternatively, the subframe n−k may be a subframe closest to the subframe n in which the aperiodic CSI request is transmitted from among a CSI subframe set associated with the subframe n.

Additionally or alternatively, the minimum value of k may be an integer less than 5 for a frequency division duplex (FDD) serving cell.

Additionally or alternatively, for a time division duplex (TDD) serving cell, the minimum value of k may be an integer less than 4 when a number of CSI processes for the UE is 2 or 3, and the minimum value of k is an integer less than 5 when the number of CSI processes for the UE is 4.

Additionally or alternatively, if the aperiodic CSI request is received in a subframe m, the updated or calculated CSI may be transmitted in a subframe m+l where l is set to an integer less than 4.

Additionally or alternatively, a subframe including the CSI reference resource may be different from a subframe in which the aperiodic CSI request is received.

According to another embodiment of the present invention, a UE for reporting a channel state based on a CSI-RS in a wireless communication system includes a transmitter and a receiver, and a processor configured to control the transmitter and the receiver. The processor is configured to transmit, to a base station, UE capability information about a maximum number of CSI processes can be simultaneously updated or calculated by the UE being configured with a shortened processing time, to receive an aperiodic CSI request from the base station, and to update or calculate CSI in a CSI reference resource at a timing configured for the shortened processing time based on the UE capability information according to the aperiodic CSI request, and transmit the updated or calculated CSI to the base station.

Additionally or alternatively, the UE capability information may include information about a maximum number of CSI processes can be updated or calculated by the UE, per numerology configured for the UE and/or per processing time configured for the UE.

Additionally or alternatively, if the updated or calculated CSI is transmitted in a subframe n, the CSI reference resource in which the updated or calculated CSI is measured may belong to a subframe n−k where a minimum value of k may be set to an integer less than a minimum value set for a UE which is not configured with a shortened processing time.

Additionally or alternatively, the subframe n−k may be a subframe closest to the subframe n in which the aperiodic CSI request is transmitted from among a CSI subframe set associated with the subframe n.

Additionally or alternatively, the minimum value of k may be an integer less than 5 for an FDD serving cell.

Additionally or alternatively, for a TDD serving cell, the minimum value of k may be an integer less than 4 when a number of CSI processes for the UE is 2 or 3, and the minimum value of k is an integer less than 5 when the number of CSI processes for the UE is 4.

Additionally or alternatively, if the aperiodic CSI request is received in a subframe m, the updated or calculated CSI may be transmitted in a subframe m+l where l is set to an integer less than 4.

Additionally or alternatively, a subframe including the CSI reference resource may be different from a subframe in which the aperiodic CSI request is received.

The foregoing solutions are merely a part of the embodiments of the present invention, and those skilled in the art could derive and understand various embodiments reflecting the technical features of the present invention from the following detailed description of the present invention.

Advantageous Effects

According to the embodiments of the present invention, channel state measurement and reporting can be carried out efficiently.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the present invention, and are incorporated in and constitute a part of this specification, illustrate embodiments of the invention and together with the description serve to explain the principles of the invention.

BEST MODE FOR CARRYING OUT THE INVENTION

Figure 1:
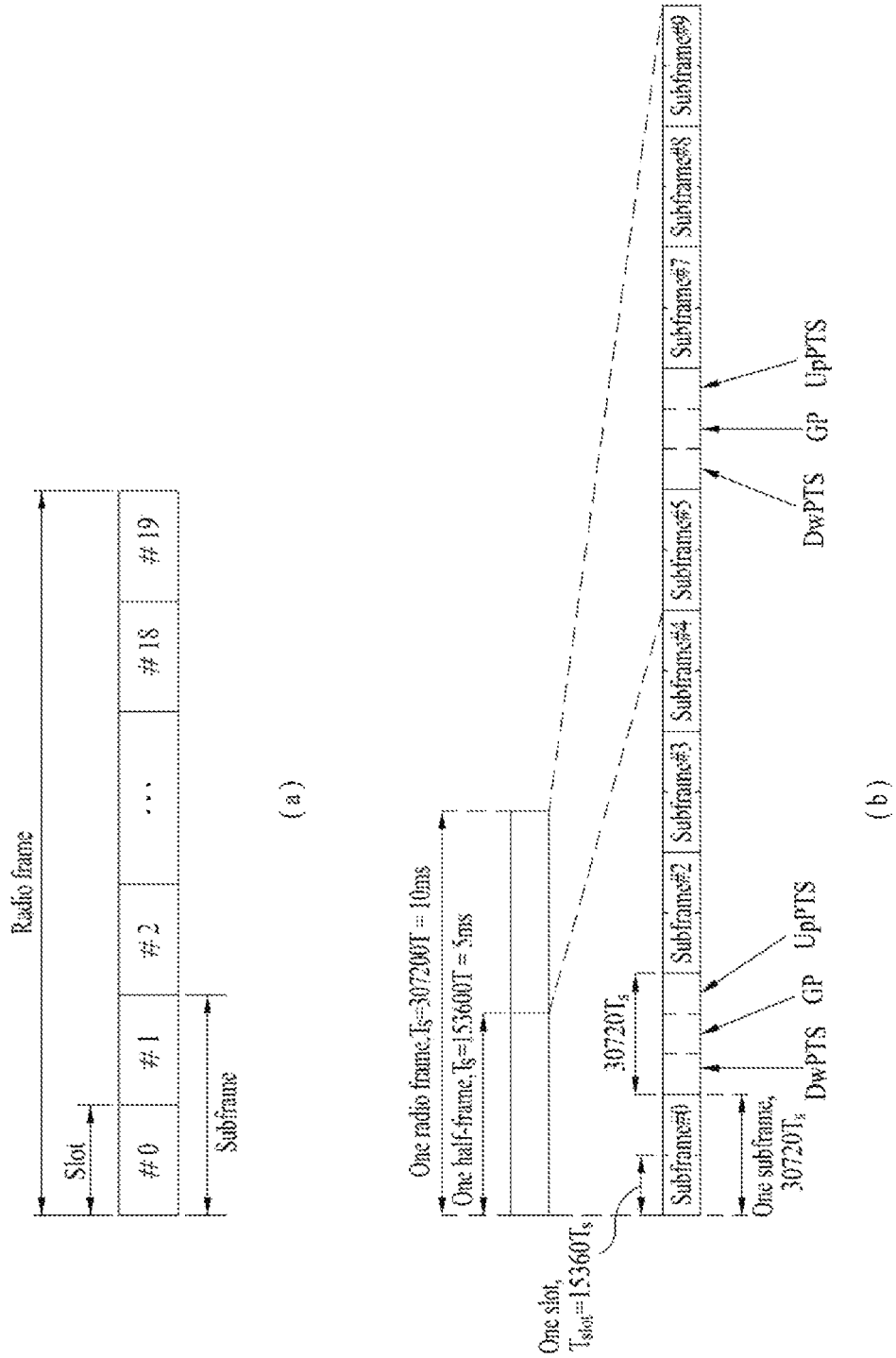
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
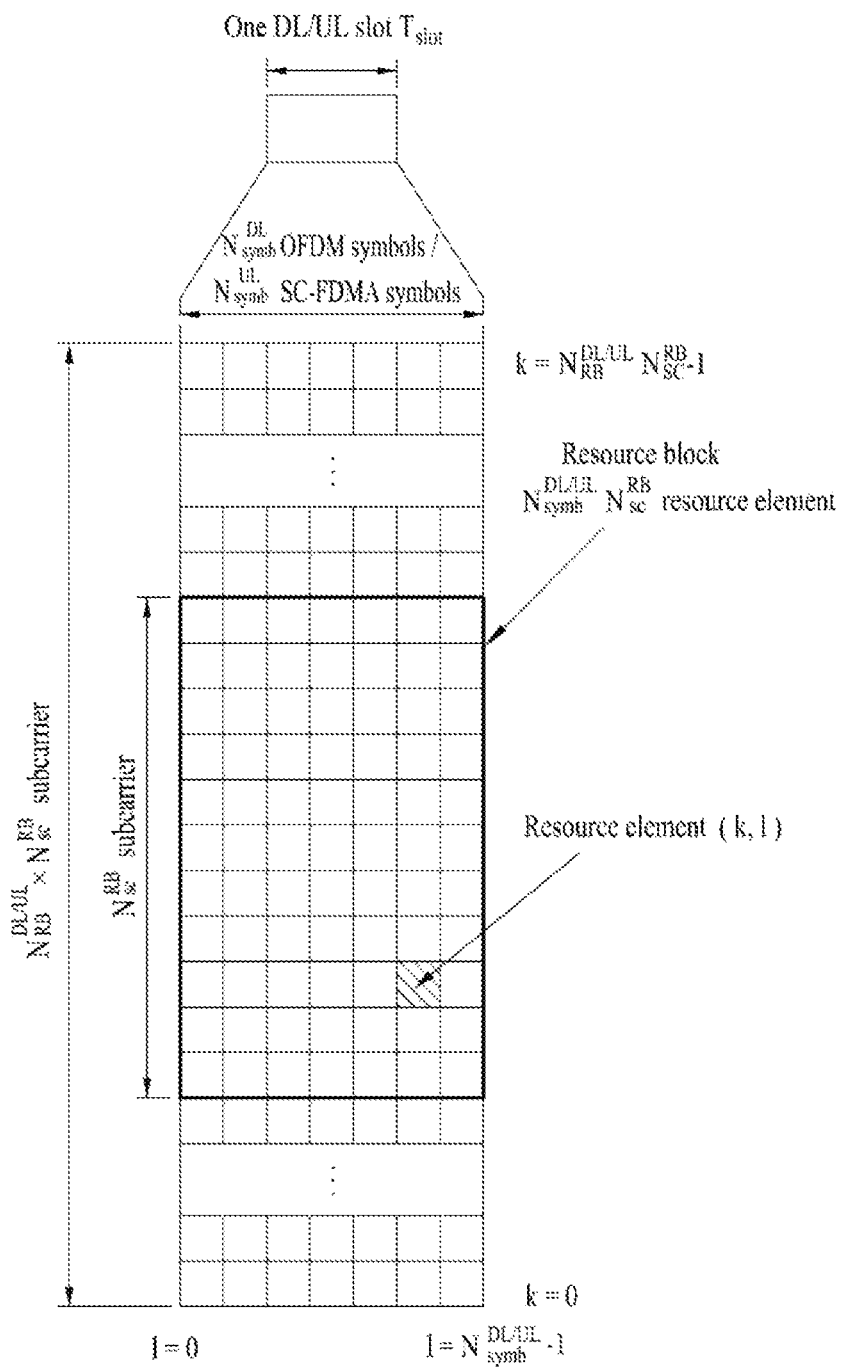
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
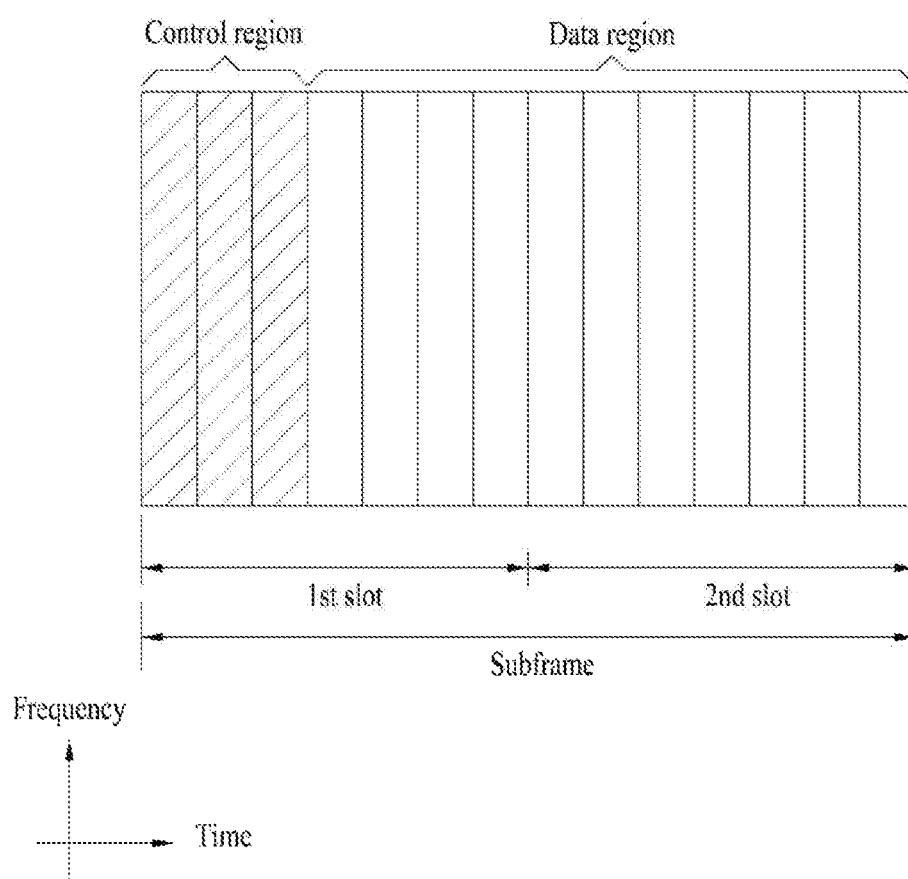
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
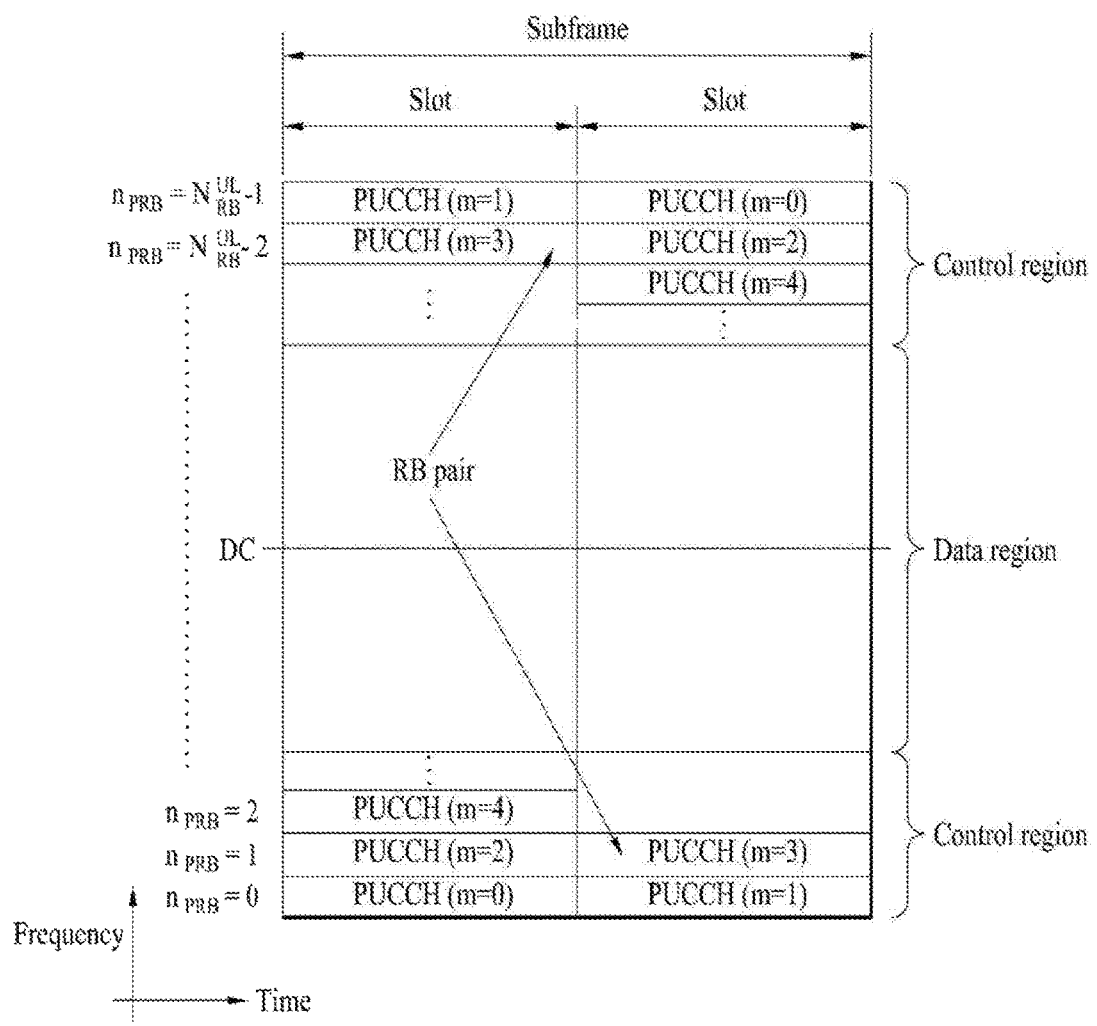
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
| --- | --- | --- | --- | --- |
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
| | UE selected (Subband CQI) | | Mode 2-0 RI (only for Open- | Mode 2-2 RI |

TABLE 6-continued

| | PMI Feedback Type | | |
|---|---|---|---|
| | No PMI | Single PMI | Multiple PMIs |
| | loop SM)<br>1st wideband<br>CQI(4 bit) + Best-M<br>CQI(2 bit)<br>(Best-M CQI: An<br>average CQI for M<br>SBs selected from<br>among N SBs)<br>Best-M index<br>(L bit) | | 1st wideband<br>CQI(4 bit) + Best-M<br>CQI(2 bit)<br>2nd wideband<br>CQI(4 bit) + Best-M<br>CQI(2 bit) if RI > 1<br>Best-M index (L bit)<br>Wideband<br>PMI(4 bit) + Best-M<br>PMI(4 bit)<br>(if 8Tx Ant,<br>wideband W2 +<br>Best-M W2 +<br>wideband W1) |
| Higher Layer-<br>configured<br>(Subband CQI) | Mode 3-0<br>RI (only for Open-<br>loop SM)<br>1st wideband<br>CQI(4 bit) +<br>N*subbandCQI(2 bit) | Mode 3-1<br>RI<br>1st wideband<br>CQI(4 bit) +<br>N*subbandCQI(2 bit)<br>2nd wideband<br>CQI(4 bit) +<br>N*subbandCQI(2<br>bit) if RI > 1<br>Wideband<br>PMI(4 bit)<br>(if 8Tx Ant,<br>wideband W2 +<br>wideband W1) | Mode 3-2<br>RI<br>1st wideband<br>CQI(4 bit) +<br>N*subbandCQI(2 bit)<br>2nd wideband<br>CQI(4 bit) +<br>N*subbandCQI(2<br>bit) if RI > 1<br>N*Subband<br>PMI(4 bit)<br>(N is the total # of<br>subbands)<br>(if 8Tx Ant,<br>N*subband W2 +<br>wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/ PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  | PMI feedback type | |
| --- | --- | --- |
|  | No PMI | Single PMI |
| PUCCH CQI feedback type — Wideband (wideband CQI) | Mode 1-0 | Mode 1-1 |
| UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.
ix) Type 7: the UE transmits a CRI(CSI-RS resource indicator) and an RI.
x) Type 8: the UE transmits a CRI, an RI and a WB PMI.
xi) Type 9: the UE transmits a CRI, an RI and a PTI (precoding type indication).
xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |

TABLE 8-continued

| Values of CSI request field | Description |
| --- | --- |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

The latency of packet data is one of important performance metrics. It may be said that providing faster Internet access with a shortened latency to end users is one of challenging issues in designing a next generation mobile communication system called new radio access technology (new RAT) as well as LTE.

As efforts to increase data rates, various techniques such as CA, massive multiple input multiple output (MIMO), higher modulation orders, and so on have been introduced for the recent LTE standards. However, shortening a processing time to dramatically reduce the latency of the user plane and, at the same time, increase transmission control protocol (TCP) throughput may be one of key technologies. For the recent LTE standardization, a technique of reducing the DL reception-UL transmission timings of 'UL grant-to-PUSCH' and 'DL data-to-DL HARQ feedback' is under discussion in order to shorten a processing time.

Meanwhile, whether fast CSI update is possible may be an important factor in determining system performance. In other words, faster CQI update may enable faster rate adaptation, and the improvement of system performance may be expected from the faster rate adaptation. In a system supporting a shortened processing time, a network may perform more optimized scheduling on the basis of a faster CSI feedback.

The present invention proposes a method of performing a CSI feedback in a situation in which a shortened processing time is supported. While for the convenience's sake, the invention or proposals are described in the context of LTE in the present disclosure, the same contents are also applicable to technologies that use different waveforms/frame structures such as new RAT. While a specific TTI length is assumed in embodiments of the present invention, for the convenience of description, it is obvious that the present invention is also applicable to different TTI length configurations (e.g., shortened TTI (sTTI) (<1 msec), longTTI (=1 msec), and longerTTI (>1 msec)). For example, an sTTI may be introduced to the next-generation system in a manner that increases a subcarrier spacing.

[Proposal 1] CSI feedback based on shortened processing time

[1-1] CSI feedback in case of different processing times for UL data and CSI

To transmit UL data, the UE should consider the following timings.

Channel estimation of PDCCH blind detection of PDCCH

Power control of PUSCH

Turbo coding of PUSCH

Timing advance

The current LTE rel-13 standard specifies a time taken for 'UL grant-to-PUSCH' as 4 subframes. A shorter time may be taken for a UE supporting a shortened processing time to perform the operation. Accordingly, the UE may be able to transmit UL data, which has been scheduled by a UL grant in subframe #n, in subframe #n+k (k is an integer less than 4). If CSI reporting is triggered by an aperiodic CSI request in the UL grant, the UE may transmit a CSI report on a PUSCH in subframe #n+k only when the UE also completes CSI-related calculation for a relatively short time. However, it may be difficult to reduce the time taken for CSI calculation depending on the capability of the UE.

A CSI feedback may be triggered by a UL grant for requesting aperiodic CSI (A-CSI), aside from a UL grant for PUSCH scheduling. In one method, it may be regulated that for a UL grant triggering 'A-CSI only PUSCH', a CSI feedback is performed using a predefined, preconfigured, or signaled 'DL-to-UL Tx timing' (which is different from DL-to-UL Tx timing for a PUSCH).

In another method, it may be regulated that a UL grant transmitted at a specific time indicates the transmission timings of a PUSCH and A-CSI. That is, a PUSCH and another PUSCH carrying A-CSI, which have different transmission timings, may be scheduled by one UL grant. For example, it may be regulated that to enable transmission of a PUSCH in subframe #n+k1 and transmission of CSI in subframe #n+k2 by a UL grant transmitted in subframe #n, information about k1 and k2 is predefined, configured by higher-layer signaling, or dynamically indicated by the UL grant. Characteristically, it may be regulated that the information about k1 and k2 indicates a CSI transmission time relative to a PUSCH transmission timing by an offset.

For CSI scheduling information, PUSCH scheduling information may be reused with a partial modification. For example, it may be regulated that information such as resource allocation information for CSI is transmitted in predefined or signaled additional frequency resources. Further, it may be regulated that separate HARQ processes are included in a UL grant so that HARQ-ACKs for a PUSCH and CSI are transmitted at different timings.

Or it may be regulated that aperiodic CSI is triggered only in a subframe/sTTI/slot corresponding to a predetermined subframe index, sTTI index (in a subframe), or slot index. The regulation on a subframe index, an sTTI index, or a slot index may be useful when a processing time to an (s) PUSCH corresponding to the subframe index, sTTI index, or slot index is long relative to other subframes, sTTIs, or slots, and may be set, for example, by a TDD DL/UL configuration, by sharing a DM-RS of an sTTI, or at the moment of setting a UL transmission timing.

[1-2] Simplification of CSI Calculation

If a CSI request and reporting time line is to be supported at the same level as a supported shortened processing time, there may be a need for simplifying CSI calculation. In one method, it may be regulated that when a shortened processing time-related configuration is enabled (e.g., a shorter 'DL-to-UL Tx timing' than a legacy timing is set/indicated), a report is transmitted in a periodic CSI reporting mode, or wideband reporting (e.g., Mode 1-0 or Mode 1-1) or subband reporting among aperiodic CSI reporting modes is performed, while ignoring a reporting mode configured for a UE.

Considering that complexity may increase with the number of subbands, the subband reporting may be restricted to the best subband and the second best subband determined based on a previous CSI report (which may be, characteristically, a CSI report transmitted in a long TTI or a report at the closest time among periodic CSI reports), or a predefined or signaled number of best subbands, or for the subband reporting, a subband in which CSI is to be calculated may be indicated by semi-static and/or dynamic signaling. In other words, in the case of aperiodic CSI triggered in an sTTI or the like, a periodic CSI report may be transmitted instead. Or a measured CQI and/or a measured PMI and/or a measured RI may all be transmitted by a periodic CSI report.

That is, a CSI report to be introduced to support a shortened processing time may be limited to a CSI report transmittable without new computation. For this configuration, it may be assumed that although periodic CSI is configured and measured, a report itself is triggered aperiodically in an sTTI or the like. Further, a measurement reference resource for this CSI may be configured based on the sTTI. Characteristically, a subband or band for CSI calculation may be limited to a (contiguous/non-contiguous) bandwidth (BW) configured with an sTTI. Or it may be regulated that if a shortened processing time-related configuration is enabled, the UE readjusts the size of a subband determined based on a system BW to be larger in order to reduce the overhead of CSI calculation.

In another method, processing time-based PMI set limits may be configured for a UE, and it may be regulated that a PMI set limit to be used by the UE is determined according to a 'DL-to-UL Tx timing' configured or indicated for a corresponding UL grant. Characteristically, it may be regulated that for a shorter processing time, the UE uses a set of fewer PMIs for PMI calculation.

In another method, it may be regulated that when a shortened processing time-related configuration is enabled (e.g., when a shorter 'DL-to-UL Tx timing' than the legacy timing is set or indicated), a UE determines whether to follow a reporting mode configured by a network or perform wideband reporting or larger subband-based reporting according to the number of triggered CSI processes.

In another method, it may be regulated that a plurality of reporting modes per CSI process are preconfigured, and a reporting mode is determined according to a 'DL-to-UL Tx timing' and/or a numerology (e.g., a UL TTI length).

In another method, it may be regulated that when a shortened processing time-related configuration is enabled (e.g., when a shorter 'DL-to-UL Tx timing' than the legacy timing is set or indicated), CSI is selectively calculated and/or reported only for a predetermined number of CSI processes among CSI processes linked to a state indicated by an A-CSI request bit. Herein, the number of CSI processes for which CSI is to be calculated and/or reported may be preset/predefined or signaled by the network in consideration of a numerology (e.g., a TTI length) and/or a processing time and/or a maximum simultaneous CSI update/calculation capability reported by the, or may be autonomously determined and then reported by the UE. Herein, the UE may transmit a CSI feedback including information about the number and/or indexes of CSI processes for which the UE is to report CSI, in a CSI report set triggered by the A-CSI request bit. For example, it may be regulated that if the 'DL-to-UL Tx timing' is set to 2 ms for the UE, the UE calculates and/or reports CSI only for one CSI process in a set trigged by an A-CSI request.

According to the current LTE standards, CSI-RSs may be configured in OFDM symbols #5, #6, #9, #10, #12, and #13. When A-CSI reporting is triggered by UL grant DCI in subframe #n, a UE in TM 9/10 may expect to perform channel measurement for CSI calculation until the end of a corresponding subframe, considering that a CSI-RS is also transmitted in the corresponding subframe. If it is pre-agreed that a CSI-RS configuration corresponding to an OFDM symbol in the latter half of a subframe is not configured for a UE, the UE may transmit data and a CSI report at a shorter 'DL-to-UL Tx timing'. Therefore, it may be regulated that when a shortened processing time-related configuration is enabled, only a specific CSI-RS configuration is configured for a UE. The specific CSI-RS configuration may be a CSI-RS configuration including OFDM symbols (e.g., OFDM symbols #5 and #6, or OFDM symbols #5, #6, #9, and #10) in the former half of a subframe. Or it may be regulated that when a shortened processing time-related configuration is enabled, a specific CSI-RS configuration is not configured for a UE. The specific CSI-RS configuration may be a CSI-RS configuration including OFDM symbols (e.g., OFDM symbols #12 and #13) in the latter part of a subframe.

In a specific example, it may be regulated that for FDD, 4 ports, and a normal CP, if a shorter 'DL-to-UL Tx timing' than the legacy timing is set or indicated, a UE is configured only with the remaining CSI-RS configuration except for CSI configurations 4 and 9 corresponding to OFDM symbols #12 and #13.

Likewise, it may be expected that channel measurement for CSI calculation is performed until the end of a specific subframe, for EPDCCH BD. Therefore, it may be regulated that when a shortened processing time-related configuration is enabled, a corresponding UE is not scheduled by an EPDCCH. In other words, when the shortened processing time-related configuration is enabled, the UE does not perform EPDCCH BD, while performing PDCCH BD, expecting that the UE will be scheduled only by a PDCCH.

[1-3] Signaling of CSI Update/Calculation/Reporting-Related Capability

In order to support an operation of triggering or reporting an appropriate amount of CSI feedback corresponding to the above-described shortened processing time, it may be favorable for the UE to report a maximum simultaneous CSI update/calculation capability to the network. Characteristically, it may be regulated that a maximum simultaneous CSI update/calculation capability per numerology configured for a UE, per processing time configured for the UE, or per combination of a numerology and a processing time is reported as the number of cells or CSI processes to the network. Or it may be regulated that a UE reports, to a network, a maximum number of CSI reports to be transmitted simultaneously for each numerology configured for a UE, each processing time configured for the UE, or each combination of a numerology and a processing time.

Or, the UE may report, to the network, a time taken for CSI processing as the number of predefined or pre-agreed time units. For example, the UE may report a time taken for CSI processing to the network by using configured TTI units or actual time units.

That is, in a characteristic example, when a shortened processing time is configured for the UE, the UE is not requested to update CSI for cells or CSI processes at or beyond a maximum simultaneous CSI update/calculation capability corresponding to the shortened processing time.

[1-4] Restriction on Maximum Transport Block Size (TBS)

A UE is capable of a limited amount of data and a limited amount of a CSI report for a predetermined time. Therefore, a different maximum TBS may be set per a numerology configured for the UE and/or per processing time configured for the UE and/or depending on whether CSI reporting is triggered by an aperiodic CSI request included in a UL grant. For example, if CSI reporting is triggered by an aperiodic CSI request included in a UL grant, a small maximum TBS may be set, relative to a maximum TBS which might otherwise be set.

Additionally, when CSI reporting is triggered by an aperiodic CSI request in a UL grant, a different maximum TBS may be set for each number of CSI processes (CSI process groups) in consideration of the number of CSI processes (CSI process groups) linked to the triggered state.

[1-5] Restriction on Maximum Resource Allocation

As a smaller amount of frequency resources are scheduled for a UE, a processing time for MIMO decoding at the UE may be shortened. Therefore, a different size of a maximum frequency resource area allowed for allocation may be set per a numerology configured for a UE and/or per processing time configured for the UE and/or depending on whether CSI reporting is triggered by an aperiodic CSI request included in a UL grant. "A maximum frequency resource area allowed for allocation" may be determined by a system BW, or the total size of subbands configured for the UE for the usage of different numerologies.

Additionally, when CSI reporting is triggered by an aperiodic CSI request included in a UL grant, a different size of a maximum frequency resource area allowed for allocation may be set for each number of CSI processes (CSI process groups) in consideration of the number of CSI processes (CSI process groups) linked to the triggered state.

[1-6] Restriction on the Number of CSI Processes

It may be regulated that when CSI reporting is triggered by an aperiodic CSI request included in a UL grant, a 'DL-to-UL Tx timing' is determined according to the number of CSI processes (CSI process groups) linked to the triggered state. A different 'DL-to-UL Tx timing' may be set independently per numerology configured for a UE and/or depending on whether CSI reporting is triggered by an aperiodic CSI request included in a UL grant and/or per TBS and/or per size of an allocated frequency resource area.

[1-7] Priority of CSI Reporting/Update

It may be regulated that when CSI reporting is triggered by A-CSI requests in a plurality of UL grants having different 'DL-to-UL Tx timing' lengths, and a plurality of CSI reports have the same UL channel (e.g., PUSCH) transmission timing, a UE first updates CSI corresponding to a UL channel having a shorter 'DL-to-UL Tx timing' length.

It may be regulated that if the transmission timings of a plurality of CSI reports overlap with a specific TTI (corresponding to all or a part of the transmission timings), 'DL-to-UL Tx timing' is considered additionally as a comparison condition for prioritization in handling collision. For example, the CSI reports may be prioritized by sequentially considering or comparing parameters in the order of 'DL-to-UL Tx timing' length>CSI reporting mode>CSI process>cell index>CSI SF set index, in the order of CSI reporting mode>'DL-to-UL Tx timing' length>CSI process>cell index>CSI SF set index, or in the order of CSI reporting mode>CSI process>cell index>'DL-to-UL Tx timing' length>CSI SF set index. For CSI having the same CSI reporting mode, the CSI may be prioritized in the order of mode a-b>mode c-d (a<c, b<d), which implies that a more compact reporting mode has a higher priority (e.g., Mode 1-0 has a higher priority than Mode 2-2).

[1-8] Partial A-CSI Reporting

To allow a margin for a CSI processing time, it may be regulated that information corresponding to an A-CSI report is mapped only to a part of the resources of a UL channel on which A-CSI is to be transmitted. For example, it may be regulated that information corresponding to an A-CSI report is mapped only to a slot or a few specific symbols in the latter part of a subframe. The mapping rule may be applied differently according to a numerology and/or processing time configured for a UE. Further, the mapping rule may be applied only when the number of cells or CSI processes corresponding to an A-CSI request triggered for the UE is equal to or larger than a predefined, pre-agreed, or signaled value.

[1-9] Definition of CSI Reference Resource

According to the legacy LTE standards, a CSI reference resource is defined in the time domain as follows.

Configuration of CSI reference resource for serving cell
Case 1: When TM 1-9, or TM 10 for a single CSI process is configured, a CSI reference resource for a CSI report to be transmitted in subframe #n is configured as a single DL/special subframe, subframe #n-n_{CQI-ref}.
For periodic CSI reporting, n_{CQI-ref} is a minimum value corresponds to a corresponding CSI subframe set among values equal to or larger than 4, and selected such that the CSI reference resource to be a valid DL/special subframe.
For aperiodic CSI reporting, n_{CQI-ref} is selected such that subframe #n-n_{CQI-ref} is a valid DL/special subframe carrying an aperiodic CSI request.
For aperiodic CSI, the CSI reference resource is configured in accordance with a CSI SF set for an SF in which an aperiodic CSI request is transmitted.
For aperiodic CSI reporting based on a random access grant, n_{CQI-ref} is 4, limited to a valid DL/special subframe after a subframe in which the random access grant is received.
Case 2: When TM 10 for a plurality of CSI processes is configured, for a CSI report to be transmitted in subframe #n, a CSI reference resource for a given CSI process is configured as a single DL/special subframe, subframe #n−n_{CQI-ref}.
For FDD periodic/aperiodic CSI reporting, n_{CQI-ref} is selected such that the CSI reference resource to be a valid DL subframe with a minimum value that corresponds to a corresponding CSI subframe set from among values equal to or larger than 5.
It is expected that a longer time will be taken than in a single CSI process.
For aperiodic CSI, the CSI reference resource is configured in accordance with a CSI SF set in which an aperiodic CSI request is transmitted.
For FDD aperiodic CSI reporting based on a random access grant, n_{CQI-ref} is 5 and DL-valid, limited to a case in which n−n_{CQI-ref} is after the random access grant.
For aperiodic CSI, the CSI reference resource is configured in accordance with a CSI SF set in which an aperiodic CSI request is transmitted.
For periodic/aperiodic CSI reporting for 2 or 3 TDD CSI processes, n_{CQI-ref} is selected such that the CSI reference resource to be a valid DL subframe with a minimum value (a closest subframe) that corresponds a corresponding CSI subframe set from among values equal to or larger than 4.
For aperiodic CSI, the CSI reference resource is configured in accordance with a CSI SF set in which an aperiodic CSI request is transmitted.
For aperiodic CSI reporting based on a random access grant in 2 or 3 TDD CSI processes, n_{CQI-ref} is 4 and DL-valid, limited to a case in which n-n_{CQI-ref} is after the random access grant.
The CSI reference resource is configured in accordance with a CSI SF set in which an aperiodic CSI request is transmitted.
For periodic/aperiodic CSI reporting for 4 TDD CSI processes, n_{CQI-ref} is selected such that the CSI reference resource to be a valid DL subframe with a minimum value (a closest subframe) that corresponds a corresponding CSI subframe set from among values equal to or larger than 5.
For aperiodic CSI, the CSI reference resource is configured in accordance with a CSI SF set in which an aperiodic CSI request is transmitted.
For aperiodic CSI reporting based on a random access grant in 4 TDD CSI processes, n_{CQI-ref} is 5 and DL-valid, limited to a case in which n-n_{CQI-ref} is after the random access grant.
The CSI reference resource is configured in accordance with a CSI SF set in which an aperiodic CSI request is transmitted.

For aperiodic CSI reporting in Case 1, a CSI reference resource is defined in a valid DL/special subframe carrying a CSI request. However, if a shortened processing time is applied to 'UL grant-to-PUSCH transmission', the margin between a reference resource for CSI measurement and a reporting time is further reduced, which may impose a burden depending on implementation of the UE.

Therefore, a different (time-domain) CSI reference resource may be defined for each processing time configured for the UE. Characteristically, if TM 1-9 or TM 10 for a single CSI process is configured for a UE configured with a shortened processing time, a CSI reference resource for an aperiodic CSI report to be transmitted in subframe #n may be configured as a single DL/special subframe, subframe #n-n_{CQI-ref} where n_{CQI-ref} may be defined as the minimum value (i.e., the closest subframe) of DL/special subframes included in a corresponding CSI SF set, among values equal to or larger than k.

Herein, k may be defined/agreed to be 4, a predefined or pre-agreed value, or a specific value different for each processing time, indicated by higher-layer signaling or physical-layer signaling. For example, for k=4, if TM 1-9 or TM 10 for a single CSI process is configured for the UE configured with a shortened processing time, even though a valid DL/special subframe carrying a CSI request is subframe #n−3, a CSI reference resource for an aperiodic CSI report to be transmitted in subframe #n may be configured as a single DL/special subframe, subframe #n−n_{CQI-ref} where n_{CQI-ref} may be defined as the minimum value (the closest subframe) of valid DL/special subframes included in a corresponding CSI SF set, among values equal to or larger than 4. That is, a valid subframe configured as a CSI reference resource may be defined to be different from a valid DL/special subframe carrying a CSI request.

Or unlike the above case, it may be regulated that as a processing time is shortened, the margin between a reference resource for CSI measurement and a reporting time is also set to be smaller. As described before, it is assumed that n_{CQI-ref} is defined as the minimum value (i.e., closest subframe) of valid DL/special subframes, among values equal to or larger than k. Characteristically, for a UE configured with a shortened processing time, a minimum value (e.g., k in the above description) available as n_{CQI-ref} may be set to be smaller than a minimum value available as n_{CQI-ref} defined for a legacy processing time, and "a minimum value available as n_{CQI-ref}" may be pre-agreed or predefined, or configured by higher-layer signaling or physical-layer signaling, so as to be different for each processing time. For example, it may be regulated that if the 'DL-to-UL Tx timing' is set to 3 ms, n_{CQI-ref} for a periodic CSI report is selected such that the CSI reference resource to be a DL/special subframe with a minimum (closest) value corresponding to a corresponding CSI SF set from among values equal to or larger than 3.

[Proposal 2] Triggering Condition for A-CSI Only PUSCH

According to the current LTE standards, if the following conditions are satisfied, an A-CSI only PUSCH transmission, that is, a PUSCH transmission including A-CSI only without any transport block for an uplink shared channel (UL-SCH) is triggered.

When DCI format 0 is used and I_MCS=29, or when DCI format 4 is used, only one TB is enabled with I_MCS=29, and the number of transmission layers is 1, the CSI request bit field is 1 bit, aperiodic CSI reporting is triggered, and N_PRB is 4 or less, or the CSI request bit field is 2 bits, aperiodic CSI reporting is triggered for one serving cell, and N_PRB is 4 or less, or the CSI request bit field is 2 bits, aperiodic CSI reporting is triggered for a plurality of serving cells, and N_PRB is 20 or less, or the CSI request bit field is 2 bits, aperiodic CSI reporting is triggered for one CSI process, and N_PRB is 4 or less, or the CSI request bit field is 2 bits, aperiodic CSI reporting is triggered for a plurality of CSI processes, and N_PRB is 20 or less.

When an sTTI is supported, more frequency resources may be required in order to transmit A-CSI, while maintaining the same coding rate in the sTTI. Characteristically, a condition on the number of PRBs among the above triggering conditions for A-CSI only PUSCH transmission may be set to be different for each TTI length (group) from a legacy condition. Characteristically, the condition on the number of PRBs may be determined to be a function of "the number of sTTIs per 1 ms". For example, according to a TTI length, the number of PRBs may be defined to be six or seven times as large as a legacy PRB threshold, for 2 symbols, four times as large as the legacy PRB threshold, for 4 symbols, and twice as large as the legacy PRB threshold, for 7 symbols.

If a shortened processing time-related configuration is enabled, and thus it is configured that CSI is selectively reported only for a part of CSI processes linked to a state indicated by an A-CSI request bit, the above rule is not applied, and instead, a PRB condition for A-CSI only PUSCH triggering may be determined in a legacy rule. In other words, the rule may be restricted such that the rule is applied only when with an sTTI supported, the number of CSI processes linked to a state indicated by an A-CSI request bit is equal to or larger than a predefined, pre-agreed, or signaled value.

Figure 5:
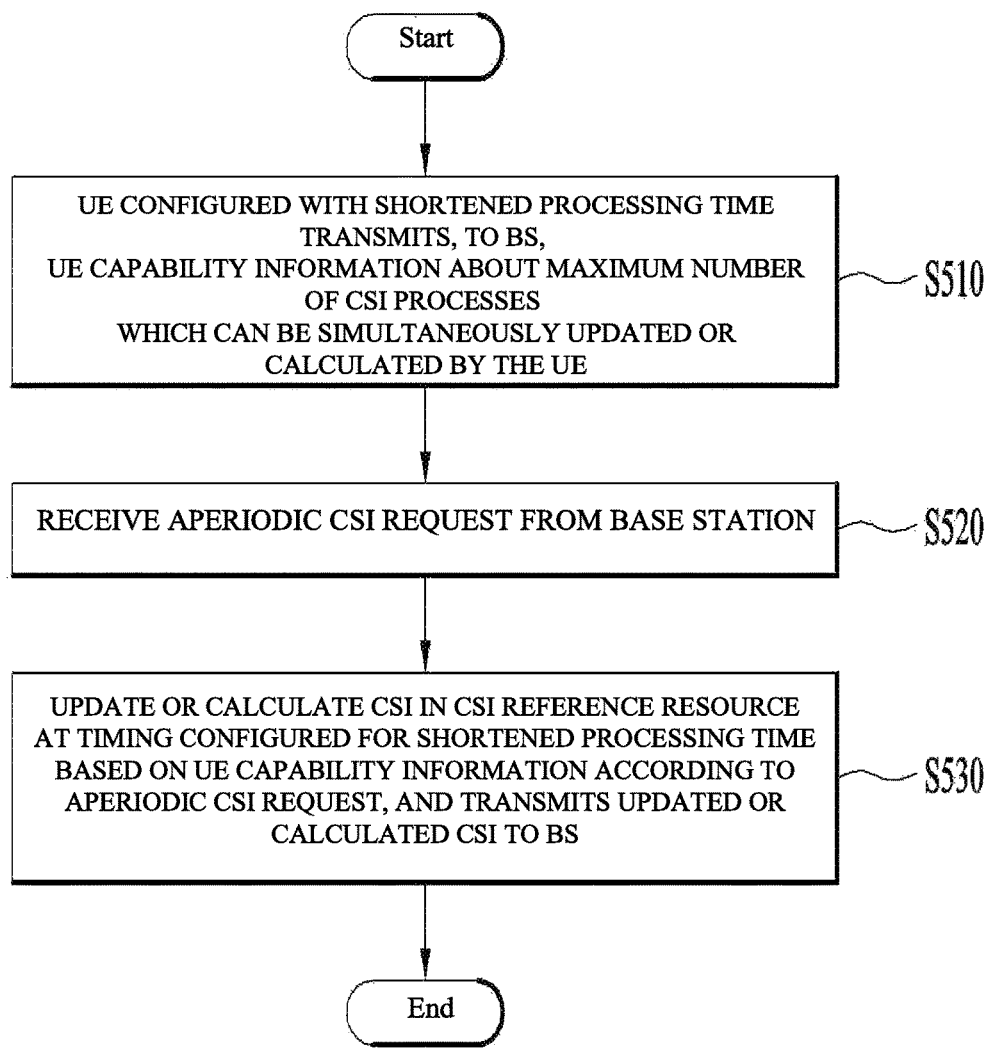
FIG. 5 illustrates an operation of a user equipment (UE) according to an embodiment of the present invention.

FIG. 5 illustrates an operation according to an embodiment of the present invention.

FIG. 5 relates to a method of reporting a channel state based on a channel state information-reference signal (CSI-RS) in a wireless communication system.

A UE configured with a shortened processing time may transmit, to a BS, UE capability information about a maximum number of CSI processes that can be simultaneously updated or calculated by the UE configured with a shortened processing time (S510). The UE may receive an aperiodic CSI request from the BS (S520). The UE may then update or calculate CSI in a CSI reference resource at a timing configured for the shortened processing time on the basis of the UE capability information according to the aperiodic CSI request, and transmit the updated or calculated CSI to the BS (S530).

Further, the UE capability information may include information about a maximum number of CSI processes that can be simultaneously updated or calculated by the UE, per numerology configured for the UE and/or per processing time configured for the UE.

If the updated or calculated CSI is transmitted in a subframe n, the CSI reference resource in which the updated or calculated CSI is measured belongs to a subframe n−k where a minimum value of k may be set to an integer less than a minimum value set for a UE which is not configured with a shortened processing time.

The subframe n−k may be a subframe closest to the subframe n in which the aperiodic CSI request is transmitted from among a CSI subframe set associated with the subframe n.

Further, the minimum value of k may be an integer less than 5 for a frequency division duplex (FDD) serving cell. Further, for a time division duplex (TDD) serving cell, the minimum value of k may be an integer less than 4 when a number of CSI processes for the UE is 2 or 3, and the minimum value of k is an integer less than 5 when the number of CSI processes for the UE is 4.

Further, if the aperiodic CSI request is received a subframe m, the updated or calculated CSI may be transmitted in a subframe m+l where l may be set to an integer less than 4.

Further, a subframe including the CSI reference resource may be different from a subframe in which the aperiodic CSI request is received.

While the embodiments of the present invention have been described briefly with reference to FIG. 5, an embodiment related to FIG. 5 may alternatively or additionally include at least a part of the afore-described embodiment(s).

Figure 6:
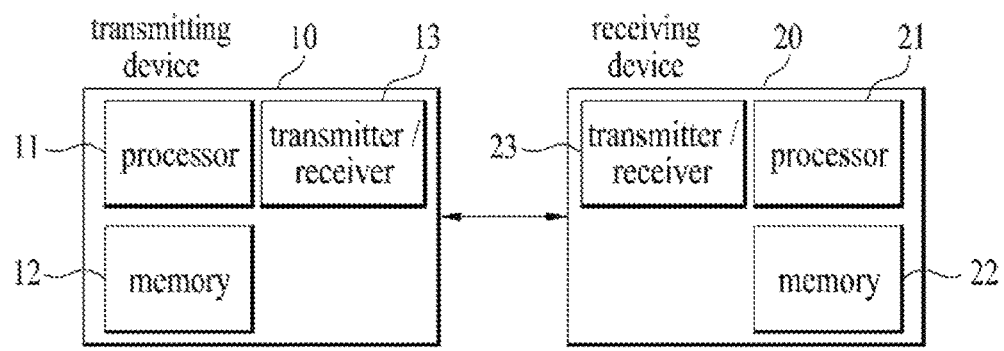
FIG. 6 is a block diagram of apparatuses for implementing embodiment(s) of the present invention.

FIG. 6 is a block diagram of a transmitting device 10 and a receiving device 20 configured to implement exemplary embodiments of the present invention. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or the receiving device may be configured as a combination of one or more embodiments of the present invention.

It will be apparent to those skilled in the art that various modifications and variations can be made in the present invention without departing from the scope of the invention. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

The invention claimed is:

1. A method of reporting channel state information (CSI) by a user equipment (UE) in a wireless communication system, the method comprising:

receiving an aperiodic CSI request from a base station (BS);

determining the CSI based on a CSI reference resource related to the aperiodic CSI request; and transmitting a CSI report including the CSI, wherein the CSI report is transmitted in a time interval n, wherein the CSI reference resource belongs to a time interval n-$n_{CQI\_ref}$ in a time domain, wherein $n_{CQI\_ref}$ is an integer greater than or equal to k, and wherein k depends on whether the UE is configured with a shortened processing time or not.

2. The method according to claim 1, wherein the time interval n-$n_{CQI\_ref}$ is different from a time interval in which the aperiodic CSI request is received.

3. The method according to claim 1, wherein $n_{CQI\_ref}$ is the smallest value among candidate values $n_{CQI\_ref\_candidate}$ that are greater than or equal to k, and wherein the time interval n-$n_{CQI\_ref\_candidate}$ is a valid downlink time interval.

4. The method according to claim 1, wherein k is a first positive integer when the UE is configured with the shortened processing time, and a second positive integer when the UE is not configured with the shortened processing time, and wherein the first positive integer is smaller than the second positive integer.

5. The method according to claim 4, wherein the second positive integer is 5 for frequency division duplex (FDD), and the first positive integer is smaller than 5.

6. The method according to claim 4, wherein the second positive integer is 4 for time division duplex (TDD) and 2 or 3 CSI processes, and the first positive integer is smaller than 4.

7. The method according to claim 4, wherein the second positive integer is 5 for TDD and 4 CSI processes, and the first positive integer is smaller than 5.

8. The method according to claim 1, wherein each time interval comprises 14 orthogonal frequency division multiplexing (OFDM) symbols in the time domain.

9. A user equipment (UE) for reporting channel state information (CSI) in a wireless communication system, the UE comprising:

a transmitter and a receiver; and a processor configured to control the transmitter and the receiver, wherein the processor is configured to:

receive, via the receiver, an aperiodic CSI request from a base station (BS), determine the CSI based on a CSI reference resource related to the aperiodic CSI request; and transmit, via the transmitter, a CSI report including the CSI, wherein the CSI report is transmitted in a time interval n, wherein the CSI reference resource belongs to a time interval $n-n_{CQI\_ref}$ in a time domain, wherein $n_{CQI\_ref}$ is an integer greater than or equal to k, and wherein k depends on whether the UE is configured with a shortened processing time or not.

10. The UE according to claim 9, wherein the time interval $n-n_{CQI\_ref}$ is different from a time interval in which the aperiodic CSI request is received.

11. The UE according to claim 9, wherein $n_{CQI-ref}$ is the smallest value among candidate values $n_{CQI\_ref\_candidate}$ that are greater than or equal to k, and wherein the time interval $n-n_{CQI\_ref\_candidate}$ is a valid downlink time interval.

12. The UE according to claim 9, wherein k is a first positive integer when the UE is configured with the shortened processing time, and a second positive integer when the UE is not configured with the shortened processing time, and wherein the first positive integer is smaller than the second positive integer.

13. The UE according to claim 12, wherein the second positive integer is 5 for frequency division duplex (FDD), and the first positive integer is smaller than 5.

14. The UE according to claim 12, wherein the second positive integer is 4 for time division duplex (TDD) and 2 or 3 CSI processes, and the first positive integer is smaller than 4.

15. The UE according to claim 12, wherein the second positive integer is 5 for TDD and 4 CSI processes, and the first positive integer is smaller than 5.

16. The UE according to claim 9, wherein each time interval comprises 14 orthogonal frequency division multiplexing (OFDM) symbols in the time domain.

* * * * *